Oct. 22, 1968  R. E. RUTZEN ET AL  3,406,998

STRETCHER-COT HOLDING DEVICE

Filed Aug. 8, 1966

INVENTORS
Robert E. Rutzen,
Walter L. Fry Jr., &
George R. Squibb

Dale A. Winnie
ATTORNEYS

3,406,998
STRETCHER-COT HOLDING DEVICE
Robert Elmer Rutzen, Pontiac, Walter Lincoln Fry, Jr., Birmingham, and George Robert Squibb, Bloomfield Hills, Mich., assignors to Automotive Conversion Corporation, Troy, Mich., a corporation of Michigan
Filed Aug. 8, 1966, Ser. No. 570,837
4 Claims. (Cl. 296—19)

This invention relates to holding and retaining devices in general, and more particularly to means for holding cots and stretchers or the like in station wagons, small vans and other vehicles.

Station wagons and other multi-purpose vehicles are being used more and more for police work and as small ambulances or rescue vehicles. The station wagon is particularly useful in that the second seat may be folded down to provide added storage space as needed. However, its maximum use requires compact and secure storage of equipment in the smaller space available when the second seat is in place.

This invention is directed to means for keeping certain items secured in a compact manner in a smaller space and which is similarly adapted for like use when more space is available. More specifically, it is directed to the use of bracket means mounted on such as the back of a collapsible seat in a station wagon to hold a stretcher for storage or use. When the seat is up, the stretcher is held securely in its folded or otherwise collapsed condition. When the seat is down, the stretcher is held securely as extended and disposed for use.

It is an object of this invention to provide a device which includes two retaining devices, each adjustable and self actuating, and which may be readily mounted for the use of either, as required. Each retaining device includes a latch member which may be locked in place, for security purposes, and which may be operated from remote locations if and as desired. The construction is simple to reduce manufacturing costs and the device is easy to install, adjust as required and as otherwise necessary to assure long service and use.

Further objects and advantages to be gained in the practice of this invention will best be known and appreciated in a discussion of a specific embodiment of the invention, as follows hereinafter and as is shown in the accompanying drawings, wherein.

Figure 1:
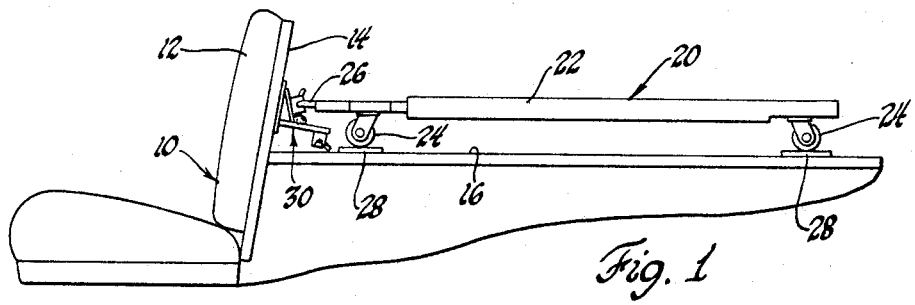
FIGURE 1 is a side elevational view of the device of this invention as used in a station wagon and is shown mounted on the back of the folding seat to hold and retain a stretcher in the reduced space therebehind.
Figure 2:
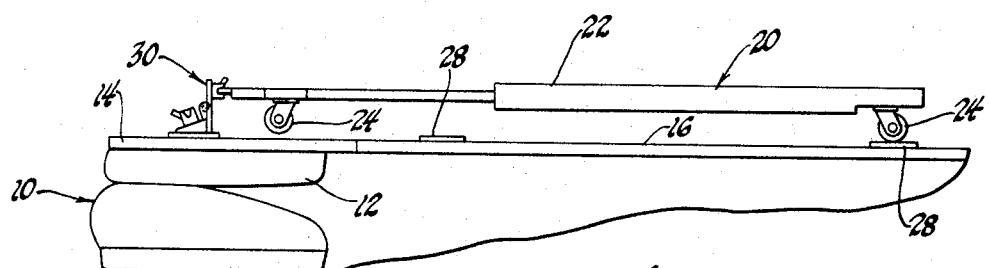
FIGURE 2 is similar to the first drawing figure and shows the device as disposed in a second position for use, with the seat of the station wagon folded down.

Referring to the drawings in further detail:

The first two figures show the rear seat 10 of a station wagon which includes a folding back 12 and having a back panel 14 thereon which forms part of the station wagon floor 16 when folded over as in the second drawing figure.

A stretcher 20 is shown as disposed in the station wagon for storage or use. It includes an aluminum frame 22 having a carrier cloth (not shown because of the side view) and which is telescopic. It includes wheels 24 and has an eye bolt connection 26 on the front frame crossmember. Guides or tracks 28 are provided on the station wagon floor 16 to assist in positioning the stretcher for storage and otherwise.

The holding and retaining bracket device 30, of this invention, is shown mounted to the back panel 14 of the rear seat 10. It includes a base plate 32 and has a channel member 34 secured at right angles thereto. A brace member 36 is secured between one end of the base plate 32 and the channel member 34. Retainer members 38 are provided on the brace 36 and channel member 34. They are adjustable and each includes latch members 40 for engagement with the eye bolt 26 on the forward end of the stretcher 20.

The base plate 32 of the bracket is of heavy gauge plate metal. It may be bolted, welded or otherwise secured to the seat back 14.

The channel member 34 is also of heavy gauge stock and it is welded or otherwise secured near one end of the base plate 32 with the channel section part open towards the longer end.

The brace member 36 is made of the same heavy gauge plate metal as the base 32. It is secured to the longer end of the base plate and bent as shown so that the diagonal part is almost vertical when the folding seat back 12 is in position for use, as best shown in FIGURE 1.

Figure 3:
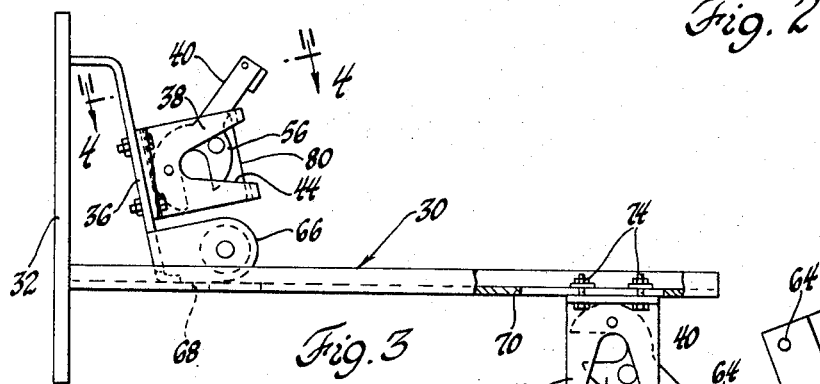
FIGURE 3 is an enlarged view of the device alone, with certain parts broken away to better illustrate certain features.
Figure 4:
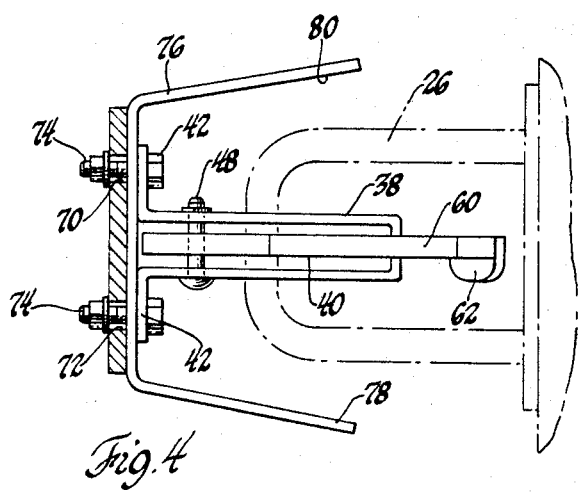
FIGURE 4 is a further enlarged view of one of the retaining members, as seen in the direction of the arrow 3 in the previous drawing figure.
Figure 5:
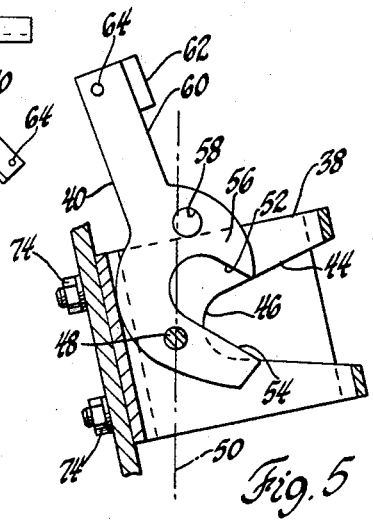
FIGURE 5 is an enlarged view of one of the retaining members, by itself, showing the latch member disposed in its receptive position.

The retainer members 38 which are provided on the channel member 34 and brace 36 are essentially the same. They are made of heavy gauge plate metal stock which is bent to an inverted U and is provided with terminal flanges 42, as best shown in FIGURE 4. A V-slot or notch 44 is cut out of the inverted U section, as shown in FIGURES 3 and 5. This slot is to guide the eye bolt 26 on the stretcher frame into the center opening 46 where it can be engaged and held by the latch members 40.

The latch members 40 are the same plate metal stock as the other parts and are formed to the shape shown best in FIGURE 5. They are pivotally connected between the legs of the retainer members 38 as by pin means 48 and they are weighted by their shape to assume the retaining positions shown in FIGURE 3. They are also formed and pinned to be able to hold an over-center open and receptive position as shown in FIGURE 5 and having reference to the phantom center line 50.

The lower end of each latch member 40 includes a slot 52 with a flat side 54 that lies across the center opening 46 in the retainer members when the latch is open. They also include a tongue part 56 that closes the center opening 46 when the latch is swung to its closed position.

It will be noted that the tongue part 56 includes an opening 58 through which a lock may be placed to keep the latch closed and whatever is engaged thereby retained secure against theft or the like.

The operating arm 60 of the latch members has a tab 62 formed at the terminal end for easier engagement and manipulation of the operating part. A small opening 64 is provided in the arm for a remote control operating cable, if desired.

A pulley 66 is welded on the channel member 34, in front of the brace 36, and an opening 68 is provided through the channel member for a remote operating cable particularly for use with one of the retainer members, as later described.

The channel member 34 and brace member 36 are each formed to include parallel spaced slots 70 and 72, as best shown with respect to the brace part in FIGURE 4. Suitable fastener means 74 are used to secure the retainer members 38 at desired positions on the brace and channel member within a range of adjustment provided by the length of the aforementioned slots. This is principally for relative height adjustment for the different retainer members, following initial installation.

A guide member 76 may be provided with each of the retainer members 38, but in the present instance is shown as used only with the one on the short diagonal brace 36. It is used to guide the eye bolt 26 on the front of the stretcher into the retainer. It includes diverging side wall parts 78 and 80, not shown in the first drawing figure because of its small size, but best seen in FIGURE 4. One of its side wall parts is broken away in FIGURE 3 but the other is identified therein.

It will be appreciated that the guide members 76, like the guides or tracks 28 on the station wagon floor 16 are optional and, to some extent, alternate aids.

Referring now to the use of the device of this invention:

After the bracket member 30 is secured to the folding back 12 of the rear seat 10 in a station wagon, the retainer member 38 on the brace part 36 is adjusted vertically to best receive the eye bolt 26 on the front end of the stretcher 20, when the seat is up. In such position it is able to receive and retain the stretcher in its telescopically shortened position within the limited space when the rear seat is folded up for passenger use.

When the stretcher is needed, one reaches over the back seat, flips the latch member 40 up and the stretcher can be removed, carried to the scene and opened up for use.

Before the stretcher is returned, with someone carried on it, the seat back 12 is folded down. This moves the bracket 30 forward and turns the channel member 34 to a vertical position where the other retainer member 38, by pre-adjustment, is in position to receive the eye bolt on the stretcher frame.

In each instance, the latch member 40 is required to be in the position shown in FIGURE 5 before the eye bolt on the stretcher frame can be engaged. When in such position, the flat side 54 on the latch part is disposed across the center opening 46 of the retainer part and in position to actuate the latch and swing it into its locking position.

To be sure the latch is open when needed, and to facilitate removing a stretcher when someone is on it, without extra attention to open the latch, the remote control cable means previously mentioned may be used. Although not specifically shown, it will be appreciated as including a slack cable extending from the tail-gate door of the station wagon and through the opening 68 in the channel bar member, over the pulley 66 and as engaged over the end of the channel bar to the latch member 40, as by the opening 64 provided in the operating arm 60 thereof. To open the latch member, one merely pulls on the control cable and the latch is opened to the receptive position such as shown by FIGURE 5. There is sufficient slack in the cable so that the control end is still within reach when the bracket is moved with the seat between different positions.

Without further discussion, it should be obvious that numerous other variations and modifications are conceivable and within the scope of this invention.

Although a preferred embodiment has been specifically shown and described in detail, this has been done to illustrate the scope of the present invention without intent to unnecessarily limit the invention thereto in any regard. Accordingly, such improvements, modifications and alterations as come to mind and are within the spirit of this invention, and are not specifically excluded by the language of the hereinafter appended claims are to be considered as inclusive thereunder.

I claim:
1. A device for use in station wagons and like vehicles having a folding seat and for use in receiving and retaining members for storage and use relative thereto, said device comprising:
  a mounting bracket having means of attachment to the back of a folding seat and including separate latch means provided at different positions thereon,
  one of said latch means being disposed for use when the folding seat is opened up and the other thereof being disposed for use when said seat is folded down,
  said mounting bracket being moved relatively forward and backward in the opening and folding down of said seat and different of said latch means being rotated into position for use therewith.
2. The device of claim 1:
  said latch means being each adjustable on said mounting bracket for relatively like positioning thereof in the different positions of said mounting bracket.
3. The device of claim 1:
  said latch means being self-actuating to latching position and including means for the remote control setting thereof.
4. A mounting bracket for use in station wagons and like vehicles having folding seats, and for receiving and holding collapsible stretchers and the like in compact assembly when said seat is up and for use when said seat is folded down, and comprising:
  a mounting plate having an extended member secured at right angles thereto and near one end thereof,
  a brace secured between the other end of said mounting plate and said extended member,
  separate latch retaining members mounted on said extended member and said brace and adjustable to different positions on each thereof and to relatively like positions for service and use,
  said brace member being vertically disposed with said mounting plate secured to the back of a folding seat and said extended member being rotated into a like position when said seat is folded down,
  and said latch retaining members each including an over center self-positioning latching member and cooperative means of actuation and latching engagement with means coming into engagement therewith.

References Cited
UNITED STATES PATENTS

| | | | |
|---|---|---|---|
| 2,309,735 | 2/1943 | Koch et al. | 296—19 |
| 2,375,896 | 5/1945 | Cox | 296—19 |
| 2,872,213 | 2/1959 | Hosford | 280—415 |
| 3,066,952 | 12/1962 | Price | 280—415 |

OTHER REFERENCES
German printed application 1,177,283.
German printed application 1,177,770.

BENJAMIN HERSH, *Primary Examiner.*

J. A. PEKAR, *Assistant Examiner.*